US012571736B2

(12) United States Patent
Ritschel et al.

(10) Patent No.: US 12,571,736 B2
(45) Date of Patent: Mar. 10, 2026

(54) CONTROL SYSTEM AND METHOD FOR DETERMINING AN ILLUMINATION INTENSITY IN A FLUORESCENCE MICROSCOPE AND CORRESPONDING MICROSCOPE SYSTEM

(71) Applicant: LEICA MICROSYSTEMS CMS GMBH, Wetzlar (DE)

(72) Inventors: Kai Ritschel, Heuchelheim (DE); Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 925 days.

(21) Appl. No.: 17/734,164

(22) Filed: May 2, 2022

(65) Prior Publication Data

US 2022/0373464 A1 Nov. 24, 2022

(30) Foreign Application Priority Data

May 21, 2021 (EP) .................................... 21175391

(51) Int. Cl.
*G01N 21/64* (2006.01)
*G02B 21/16* (2006.01)
*G02B 21/36* (2006.01)
*G05D 25/00* (2006.01)

(52) U.S. Cl.
CPC ......... *G01N 21/6458* (2013.01); *G02B 21/16* (2013.01); *G02B 21/365* (2013.01); *G05D 25/00* (2013.01)

(58) Field of Classification Search
CPC ..... G01N 21/6458; G02B 21/12; G05D 25/00
See application file for complete search history.

(56) References Cited

U.S. PATENT DOCUMENTS 4,725,720 A 2/1988 Sawada et al.
10,754,137 B2 * 8/2020 Murata .................. G02B 21/12

FOREIGN PATENT DOCUMENTS

EP 3 514 600 A1 7/2019
JP H08 21956 A 1/1996
JP 2005 250151 A 9/2005
JP 2008139794 A * 6/2008

OTHER PUBLICATIONS

Douglas B Murphy et al.: "Spectral Bleed-Through Artifacts in Confocal Microscopy," Concepts in Confocal Microscopy, Jun. 7, 2018, pp. 1-10, Olympus, Japan.

* cited by examiner

*Primary Examiner* — Lam S Nguyen
(74) *Attorney, Agent, or Firm* — LEYDIG, VOIT & MAYER, LTD.

(57) ABSTRACT

A control system for automatedly determining an illumination intensity of at least one light source of a fluorescence microscope is provided. The control system is configured to automatedly determine, after a change in a light path, a control value for the illumination intensity of the at least one light source in order to achieve a desired value of an inspection parameter characterizing sample inspection. The light path comprises at least one of: an illumination path from the at least one light source to the sample and an imaging path from the sample to at least one detector. Determining the control value is based on: (i) a value of the illumination intensity that was set before the change in the light path, (ii) a value of the inspection parameter used before the change in the light path, and (iii) a physical model of the light path.

18 Claims, 3 Drawing Sheets

CONTROL SYSTEM AND METHOD FOR DETERMINING AN ILLUMINATION INTENSITY IN A FLUORESCENCE MICROSCOPE AND CORRESPONDING MICROSCOPE SYSTEM

CROSS REFERENCE TO RELATED APPLICATIONS

This application claims benefit to European Patent Application No. EP 21175391.8, filed on May 21, 2021, which is hereby incorporated by reference herein.

FIELD

Embodiments of the present invention relate to a control system for automatedly determining an illumination intensity of a light source of a fluorescence microscope, the light source used for stimulating at a fluorophore in a sample, to microscope system comprising a fluorescence microscope and such control system, and to a corresponding method.

BACKGROUND

In fluorescence microscopy, the illumination intensity incident onto the object field (and sample) changes when changing objective lenses and/or other components in the light path and keeping illumination parameters such as field of view in the intermediate image and intensity in the intermediate image constant. In addition, the detected intensity on the detector changes in a different way.

For examining or imaging samples in fluorescence microscopy, however, a constant illumination intensity at the sample or image intensity is desired after objective change. Thus, it may be necessary to reset the illumination intensity or power of the light source.

SUMMARY

Embodiments of the present invention provide a control system for automatedly determining an illumination intensity of at least one light source of a fluorescence microscope. The at least one light source is used for stimulating at least one fluorophore in a sample. The at least one light source is configured to vary the illumination intensity. The microscope has at least one detector used for detecting an image intensity of the sample. The control system is configured to automatedly determine, after a change in a light path, a control value for the illumination intensity of the at least one light source, in order to achieve a desired value of an inspection parameter characterizing sample inspection. The light path comprises at least one of: an illumination path from the at least one light source to the sample and an imaging path from the sample to the at least one detector. Determining the control value for the illumination intensity of the at least one light source is based on: (i) a value of the illumination intensity that was set before the change in the light path, (ii) a value of the inspection parameter used before the change in the light path, and (iii) a physical model of the light path. The physical model maps the illumination intensity of the at least one light source to the inspection parameter, taking into account imaging characteristics of optical components in the light path.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
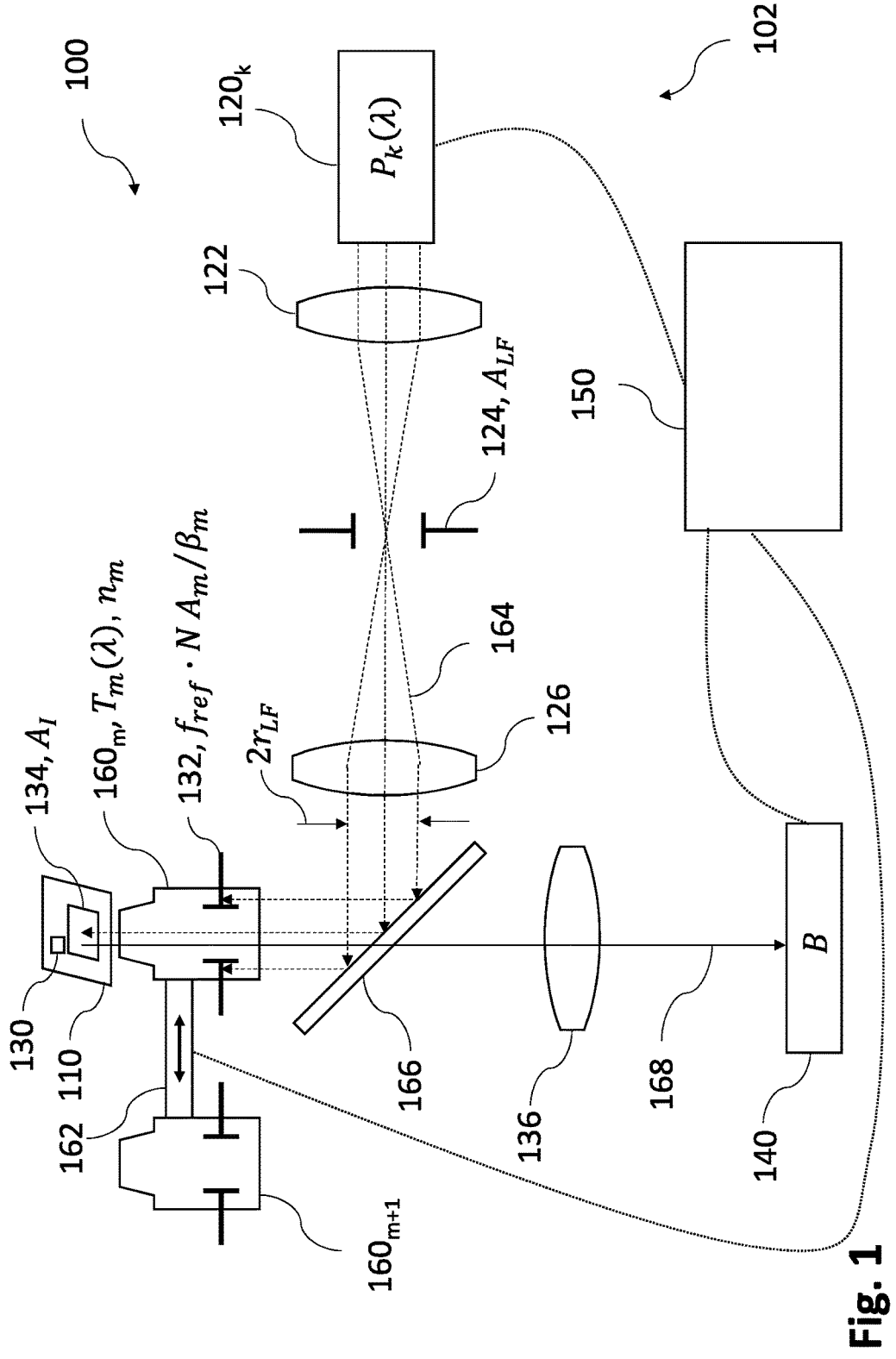
FIG. 1 schematically shows a microscope system according to an embodiment of the invention.

In view of the drawbacks and problems described above, there is a need for an improved way of adapting illumination intensity in fluorescence microscopy. According to embodiments of the invention, a control system, a microscope system with a fluorescence microscope, and a method with the features of the independent claims are provided. Advantageous further developments form the subject matter of the dependent claims and of the subsequent description.

Embodiments of the invention, generally, relate to a microscope system with fluorescence microscope, in particular an epi-fluorescence microscope, and to a control system for such a fluorescence microscope. Said control system can comprise one or more processors; it might be a separate computer (system) or a processor integrated into the microscope. The microscope comprises at least one light source that is used for stimulating at least one fluorophore (also called fluorochrome or dye; it is fluorescent chemical compound that can re-emit light upon light excitation) in a sample that is examined and/or imaged by means of said microscope. The at least one light source is configured such that its illumination intensity (also referred to as illumination power or illumination brightness) can be varied. Said fluorescence microscope further comprises at least one detector (can be part of a detector unit with several detectors) used and configured for detecting an image intensity; said image intensity is the fluorescence light emitted from the excited fluorochrome in the sample. The image intensity also depends on the illumination intensity of the light source.

In this regard, the term "light source" shall comprise any light-emitting arrangement, which is suitable for exciting a fluorophore; preferably, solid-state light sources are used. Exciting a fluorophore requires a predetermined excitation wavelength being present in the spectrum of the light source. Thus, such light source can comprise a broadband light source that comprises the excitation wavelength, a narrowband light source that comprises the excitation wavelength, or a light source with a downstream filter that filters a spectrum from the spectrum of the light source that comprises the excitation wavelength. The same applies in reverse for the term "detector". Such detector or detector unit must be able to detect the wavelength of the emitted fluorescence radiation of the fluorophore in question. For this purpose, a correspondingly broadband detector can be used or a correspondingly narrowband detector which has sufficient sensitivity for the corresponding wavelength of the fluorescence radiation. Furthermore, a broadband detector with an upstream filter can be used, the filter filtering the relevant wavelength of the fluorescence radiation and making it accessible to the sensor of the detector. The filters mentioned, which are connected after the light sources or upstream of the detectors, can be designed as a filter wheel or as a filter slide, as spectral splitter layers, spectrometer or monochromator arrangements or also, e.g., in the form of acousto-optical or liquid crystal based systems.

Each light source according to the application is intended for the direct excitation of a fluorophore, which the user assumes, is present in the sample to be imaged. Each of these light sources can be individually adjusted in terms of their illumination intensity or illumination brightness. In this way, the photon flux impinging on the directly assigned fluorophore and, thus the resulting photon flux from the fluorescence radiation that finally hits the detector can be adjusted. If a single light source excites more than one fluorophore, the so-called cross-excitation, preferably, has to be accounted for in the illumination control method.

Depending on the specific type of examination or imaging a user performs, this can require changes in a light path from the at least one light source to the sample (also called illumination path) and/or from the sample to the at least one detector (also called imaging path). Such change typically includes the change of an objective of the microscope currently arranged in the light path. In addition, other components arranged in the light path as filters and the like might be inserted, removed or exchange; this also could lead to a change in the light path with respect to illumination intensity. In case those illumination parameters such as field of view in the intermediate image and intensity in the intermediate image do not change, the illumination intensity incident onto the object field, consequently, changes due to the objective change. Besides the illumination intensity onto the sample and the fluorophores, the imaging intensity, i.e., the intensity of light emitted from the fluorophore and reaching the at least one detector might change.

Thus, in order to keep the illumination intensity onto the sample and/or the imaging intensity constant or to re-set it to a desired value (such desired value can be an appropriate value in order to achieve proper illumination for, e.g., certain experiments), the illumination intensity or illumination power of the light source must be adjusted. Manual re-setting, for example, is quite time-consuming. Thus, such adjustment, preferably, should be performed in automated manner. Automated illumination control methods might work based on databases and look-up tables for filter settings to be compatible with arc lamps and filters. Generation of data for look-up tables and databases, however, is time-consuming and requires adaption when changing hardware such as light sources. Furthermore, such methods cannot leverage the full potential of the fine and wavelength-specific adjustment possibilities of modern solid-state fluorescence light sources (illuminators).

A preferred way of implementing automatic illumination control is the use of iterative methods. For fast convergence of such iterative methods, i.e., reaching a final setting of the illumination intensity quickly, however, a good starting point is essential for the iterative method.

In order to overcome such problems, the control system according to an embodiment of the present invention is configured to automatedly determine, after a change in the light path, a control value for the illumination intensity of the at least one light source, in order to achieve a desired value of an inspection parameter characterizing sample inspection. The control system, preferably, is configured to automatedly detect said change in the light path, e.g., by means of one or more sensors at an objective turret or the like. Said inspection parameter is, in particular, based on or comprises a desired illumination intensity at the sample. Also, said inspection parameter can be based on or comprise a desired imaging intensity of the sample, which the at least one detector detects. Said desired value of the inspection parameter, in particular, is a value a user would like to have for inspection the sample; for example, such desired value is the same values that was used or set before the change. However, also any other value can be chosen or used. Said desired value of the imaging intensity of the sample detected at the detector unit can be defined based on a value derived from photon statistics detected at the detector, for example, a signal-to-noise ratio at the at least one detector, for the at least one fluorophore. Preferably, the control system also automatedly adapts the illumination intensity of the at least one light source according to the determined control value for the illumination intensity; this, in particular, is performed by means of adapting electrical power supplied to the at least one light source.

Further, said determining the control value for the illumination intensity of the at least one light source is based on a value of the illumination intensity that was set before the change in the light path, on a value of the inspection parameter used before the change in the illumination path, and on a physical model of the light path. This physical model maps or correlates the illumination intensity of the at least one light source to the inspection parameter, taking into account imaging characteristics of optical components in the light path.

Different kinds of such imaging characteristics can be taken into account in the physical model. These, preferably, comprise at least of the group of: a magnification of an objective, a transmission of an objective, a numerical aperture of an objective, a refractive index of an immersion medium, an area of an illumination field diaphragm in an intermediate image, a ratio of a total pupil area, an illuminated pupil area at the objective, and a magnification and/or focal length of a system optics component. The latter ones might comprise, for example, a magnification changer, a camera adapter, a focal length lighting module, and the like.

Embodiments of the present invention make use of implementing such physical model based on first-principle optical data in order to calculate the expected image intensity and/or illumination intensity after an objective change or the like from data known before the change, i.e. current illumination intensity and image brightness and basic optical data. This, in particular, can be used to generate an adequate starting point for an automated (iterative) illumination adjustment after the objective change, and thus lead to faster convergence.

Said physical model will be briefly described in the following, and, in more detail in the description of the Figs. and with respect to the Figs. For an epifluorescence wide-field microscope, for example, the illumination power from a light incident onto the objective pupil, which in the case of epi-illumination acts as condenser pupil, is spread over an illuminated pupil area. The power incident on the sample is then the transmission of the objective multiplied by the ratio of the pupil area of the objective to the illuminated pupil area. The objective can be assumed to have a certain magnification and can be designed for an immersion medium of a certain refractive index. This allows determining the intensity in the sample.

If the light stress of the specimen should be kept constant when changing objectives, the illumination power of light source is adapted accordingly. Assuming that only a (power-linearized) drive current of light source can be changed but not the spectrum of the light source can, the new drive current can easily be derived.

If the intensity detected in the at least one detector (image intensity) shall be kept constant, the detected solid angle, and (due to the isotropy of fluorescence emission) the amount of collected fluorescence light can be determined. Assuming that the demagnification of the pixel area of an array detector into the sample is changed analogously to the change of the demagnification of the illumination field diaphragm when changing objectives, these two area effects cancel out, and the only factors remaining affecting the detected fluorescence intensity per pixel are vignetting and solid angle. If the demagnification factor of the pixel area changes independently from the demagnification of the illumination field diaphragm, as in the case of a magnification changer, this factor can also easily be incorporated into the model in the form of the respective area magnification.

While constant factors and transmission factors can be neglected, it is easy to include transmission effects by recalculating cross-excitation and cross-emission overlap integrals from fluorophore spectral data and transmission, illumination and sensitivity spectra of the optical system.

This allows determining a new—and very good—value for the illumination intensity or of the light source right after the objective change or even during such change. As mentioned above, such value is, preferably, used as a starting value or point in an iterative method to even better adjust the illumination intensity to achieve a desired value of the examination parameter. If the starting value already fulfils the convergence criterion of the iterative method, the iteration might be completely omitted.

In such an iteration method, the values of the illumination intensity is, preferably, changed successively until the specified target value of, e.g., an illumination at the sample or the imaging intensity (for example, via the signal-to-noise ratio per fluorophore) is reached (or a convergence criterion is fulfilled). Changing the illumination intensity in this iteration method includes increasing or also reducing the illumination intensity.

While in typical iterative methods, an initial or starting value of the illumination intensity is set to, e.g., zero or the value used before the objective change, the proposed physical model allows generating a starting value that is very close to the final value; thus, the iterative method converges quite fast. This reduces the number of iterative steps required. In case of the imaging intensity as the inspection parameter, the image intensity, in particular, can be detected directly at the at least one detector. In case of the illumination intensity at the sample as the inspection parameter, also the image intensity at the at least one detector can be detected and be used (with re-calculation, if required) to determine the relevant value of the illumination intensity. In case of cross-emission, the imaging intensity per fluorophore can be reconstructed by means of de-mixing from acquired data (for cross-emission, see also below).

In a preferred embodiment, a fluorescence microscope having at least two light sources used for stimulating different ones of at least two fluorophores in the sample is used, the at least two light sources being configured to vary the illumination intensity individually. Then, a corresponding control system is configured for automatically determining, after the change in the light path, a control value for the illumination intensity for each one of the at least two light sources individually. Said physical model can then be used for each light source with the respective individual parameters like illumination intensity. A preferred way of determining the control value for the illumination intensity for each one of the at least two light sources individually is by determining a cross-excitation and/or a cross-emission of the at least two fluorophores in the sample in order to consider cross-talk effects in excitation and/or detection. Such cross-talk effects in the detector allow determining the required intensity very accurately.

In this regard, it is to be noted that, with at least two detectors, each detector according assigned to a certain fluorophore also detects—to a certain extent—fluorescence radiation from other fluorophores due to its sensitivity spectrum. Such cross-emission can be taken into account by determining the degree of cross talk during the setting of the illumination intensity of the light sources. In a similar way, a certain excitation wavelength typically does not only excite the assigned fluorophore, but—to a certain extent—also other fluorophores; this is called cross-excitation.

Cross-excitation and cross-emission of the system comprising detectors with respective detection spectra, light sources with respective light source spectra and fluorophores with respective excitation and emission spectra can be either determined a-priori from spectral data known beforehand, e. g., from system design data and calibration measurements and successive calculation of the appropriate overlap integrals of light source spectrum and excitation spectrum to yield the matrix elements of the cross-excitation matrix and of the detection spectrum and emission spectrum to yield the matrix elements of the cross-emission matrix. Alternatively, control measurements can be performed with singly labeled specimens on the system and the respective matrix elements can be derived from these controls (measurements).

As mentioned above, an embodiment of the invention also relates to a method for automatedly determining an illumination intensity of a fluorescence microscope. For any further details, preferred embodiments and advantages of the method refer to the remarks above, which apply here correspondingly.

An embodiment of the invention also relates to a computer program with a program code for performing a method according to an embodiment of the invention when the computer program is run on one or more processors or on the control system according to an embodiment of the invention.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

FIG. 1 illustrates, very schematically, a microscope system 102 comprising a fluorescence microscope 100 according to an embodiment of the invention with, by means of example, a light source $120_k$ for an excitation wavelength. This light source is, advantageously, a LED or laser with a corresponding spectrum, with a filter being able to be connected downstream if necessary. In principle, a broadband light source can also be used, from whose spectrum the desired excitation wavelength can be filtered out by means of a filter wheel or filter slide.

As shown in FIG. 1, the light source $120_k$ emits illumination light following an illumination beam path 164, which is guided into the objective $160_m$ of the microscope 100. On its way to the objective 160m, the illumination beam path 164 passes a collector lens 122, an illumination field diaphragm 124 with area $A_{LF}$, a condenser lens 126, having a pupil illumination diameter $2r_{LF}$, and is then reflected on a spectral splitter element 166. This spectral splitter element 166 is, preferably, a dichroic element, which deflects the relevant excitation wavelength and is transparent to the corresponding fluorescence radiation. The details of the optics of a fluorescence microscope are shown only very schematically in FIG. 1, since they are sufficiently well known in detail from the prior art.

The objective 160$_m$ has a pupil 132 with radius $f_{ref}\cdot NA_m/\beta_m$ (reference focal length $f_{ref}$, numerical aperture $NA_m$, and magnification $\beta_m$), a transmission $T_m$ and an immersion refractive index $n_m$. The illumination beam path 164 is directed via the objective 160$_m$ onto the sample 110 and stimulates a fluorophore 130 located therein to emit fluorescence radiation. The illuminated object field 134 of the illumination beam path has an area $A_I$. The emitted fluorescence radiation is imaged on a detector 140 with via the objective 160$_m$, tube lens 136 and any other optical imaging elements as far as required. The detection beam path falling on the detectors is denoted by 168.

The illumination intensity or brightness $P_k(\lambda)$ ("illumination power") and, thus, the emitted power of the light source 120$_k$ can be set individually. A control system 150 is provided, which is configured to set that illumination intensity. In addition, the control system 150 is in communication or operative connection with means for setting the illumination intensity of the light source. The detector 140 detects the distribution of the respective fluorophore 130 in the recorded image of the sample 110 and, thus, an image intensity B. The control system 150 is in communication or operative connection with the detector 140 in order to be able to record signals corresponding to the image intensity.

When using the fluorescence microscope 100, the illumination intensity $P_k(\lambda)$ of the light sources can be set to a desired value by means of the control system 150. In case of more than one light source (see also FIG. 2), for example, this can be in such a way that a predefined setpoint value of a signal-to-noise ratio is set for each distinguishable fluorophore. Cross-talk from a detector due to other emission spectra of fluorophores that are not directly assigned to it, as well as cross-excitation of a fluorophore being taken into account by other illumination spectra of the light sources that are not directly assigned to it, can be taken into account.

Besides the objective 160$_m$ arranged in the light path (comprising the illumination beam path 164 and the imaging beam path 168), a further objective 160$_{m+1}$ is provided in the fluorescence microscope 100, e.g., arranged on a turret 162 or other objective change mechanism together with objective 160$_m$. The objective 160$_{m+1}$ has a pupil with radius $f_{ref}\cdot NA_{m+1}/\beta_{m+1}$ (reference focal length $f_{ref}$, numerical aperture $NA_{m+1}$, and magnification $\beta_{m+1}$), a transmission $T_{m+1}$ and an immersion index $n_{m+1}$.

Depending on examination and/or imaging requirements, a user might change the objective during examination, i.e. the objective 160$_m$ is removed from the light path and the objective 160$_{m+1}$ is moved into the light path. As mentioned above, the change of the objective typically requires the illumination intensity to be adjusted in order to achieve a desired illumination intensity at the sample 110 and/or a desired imaging intensity at the detector 140.

It should be noted that a typical requirement of a user is an illumination intensity of the light source such that the illumination intensity at the sample or the imaging intensity is equal to (or as close as possible to) the value used before the objective change. However, also different desired values might be used, be it with a certain range of the value before the change with, e.g., +/−10% or +/−5% of the value, or an entirely different value. Determining of the required illumination intensity and adjusting of the illumination intensity (or power) of the light source is performed automatedly and by means of the control system 150. The process of adaption can be started, e.g., by input of a desired value (via a user interface of the like) or automatedly with/after the change of the objective (in particular when the desired value of the imaging intensity is equal to the value used before).

In the following, the physical model used within the present inventive concept will be explained based on the fluorescence microscope 100 of FIG. 1 and its parameters and imaging characteristics of the respective optical components in the light path explained above. For an epifluorescence widefield microscope, for example, the illumination power $P_k(\lambda)$ from at the light source 120$_k$ (or k) and for wavelength $\lambda$ incident onto the objective pupil, which in the case of epi-illumination acts as condenser pupil, is spread over an illuminated pupil area of $A_I$.

The power incident on the sample 110 is then the transmission $T_m(\lambda)$ of the objective 160$_m$ (or m) multiplied by the ratio of the pupil area to the illuminated pupil area, where—without loss of generality—it can be assumed that the objective pupil 132 is illuminated uniformly, otherwise ratio should be replaced by an overlap integral. The objective is assumed to have a magnification $\beta_m$ relative to a reference focal length $f_{ref}$ and a numerical aperture $NA_m$ and is designed for an immersion medium of refractive index $n_m$.

Assuming a uniform pupil illumination with a radius of $r_{LF}$ (diameter $2r_{LF}$) and an illumination field diaphragm of area $A_{LF}$ in the intermediate image, the intensity $I_m$ with objective m in the sample is $$I_m = \frac{\beta_m^2}{A_{LF}}\min\left(\left(\frac{NA_m f_{ref}}{\beta_m r_{LF}}\right)^2, 1\right)\int T_m(\lambda)P_k(\lambda)d\lambda = F_m P_{k,m}$$

In that formula, the first term is the demagnification of the illumination field diaphragm, the second term is vignetting, and the third term is the transmission of the objective. If intended to keep the light stress of the sample (i.e., the illumination intensity at the sample) constant when changing objectives, for example, the illumination intensity or power of the light source k has to be adapted such that $I_m = I_{m+1}$. Here, $I_{m+1}$ is the intensity at or in the sample with objective 160$_{m+1}$ (or m+1); in the formula above, the values for objective 160$_m$ have, thus, to be replaced by the respective values for objective 160$_{m+1}$ in order to determine the illumination intensity $I_{m+1}$.

Assuming that the spectrum cannot be changed but only a (power-linearized) drive current of the light source can be changed, the new drive current $P_{k,m+1}$ (a control value) for light source 120$_k$ using objective 160$_{m+1}$, corresponding to the new illumination intensity, is $$P_{k,m+1} = P_{k,m}\frac{F_m}{F_{m+1}}$$

wherein current $P_{k,m}$ is the drive current (control value) for light source 120$_k$ and objective 160$_m$. Note that the drive current $P_{k,m}$ or corresponding illumination intensity of the light source determined in this way, typically, results in the illumination intensity at the sample very begin close to the desired value, e.g., the value before the objective change; the value can be used as a control value to set the light source. Nevertheless, there might be some small deviations.

Thus, in a preferred embodiment, as mentioned earlier, the value $P_{k,m}$ determined in this way can be used as a starting point or starting value within an iterative method to determine a final control value that allows achieving an even better illumination intensity at the sample. In such iterative method, the starting value for the illumination intensity or power, as determined by means of the physical model, can be set; then, the respective illumination intensity at the sample or the respective imaging intensity (at the detector) is determined. Depending on the difference between this value and the desired value, the illumination intensity can further be adjusted.

These steps can be repeated until the desired value of the illumination intensity at the sample or the imaging intensity is achieved or until the achieved value deviates less than a predefined threshold from the desired value.

A particular advantage of using such physical model is that many parameters of optical components, which affect the illumination intensity at the sample, can be taken into account in a very effective way. The value resulting from such determination or calculation is a much better starting point for the iterative method than, e.g., the value used before the objective change (i.e., the starting point is much closer to the final value). Consequently, the iterative method to determine the final control value converges much faster than without the use of such physical model. Since the iterative method typically requires iterative changing illumination intensity of the light source and subsequent detection, the use of the physical model results in less energy consumption and less undesired sample irradiation.

In another embodiment, the intensity from the image detected at the detector (image intensity) shall have a desired value after the objective change (e.g., be kept constant). Thus, also the signal-to-noise ratio must have a certain value, e.g., has to be kept constant (due to the change in field of view this can be considered only on a statistical basis, such as histogram data). Then, the detected solid angle, and, due to the isotropy of fluorescence emission, the amount of collected fluorescence light for objective $160_m$ is given by the following formula:

$$\Omega_m = 2\pi \, \min\left(1 - \sqrt{1 - \frac{NA_m^2}{n_m^2}}, 1\right)$$

In that formula, the super-critical angle fluorescence is excluded by restricting the solid angle to $2\pi$. Given that the demagnification of the pixel area of an array detector into the sample is changed analogously to the change of the demagnification of the illumination field diaphragm when changing objectives, these two area effects cancel out, and the only factors remaining that affect the detected fluorescence intensity per pixel, $B_m$, are vignetting and solid angle, so that $$B_m = \min\left(\left(\frac{NA_m f_{ref}}{\beta_m r_{LF}}\right)^2, 1\right) \cdot \min\left(1 - \sqrt{1 - \frac{NA_m^2}{n_m^2}}, 1\right)$$

Note that here constant factors and transmission factors are neglected. Transmission effects can easily be included by recalculating cross-excitation and cross-emission overlap integrals from fluorophore spectral data and transmission, illumination and sensitivity spectra of the optical system. Similar to the case for the illumination intensity at the sample, the new drive current $P_{k,m+1}$ for light source $120_k$ using objective $160_{m+1}$, corresponding to the new imaging intensity, is $$P_{k,m+1} = P_{k,m} \frac{B_m}{B_{m+1}}$$

wherein current $P_{k,m}$ is the drive current for light source $120_k$ and objective $160_m$. Similar to the situation for the illumination intensity at the sample explained above, the value that is achieve in this way is, typically, very accurate. Nevertheless, an iterative method for an even better final control value can be used.

Figure 2:
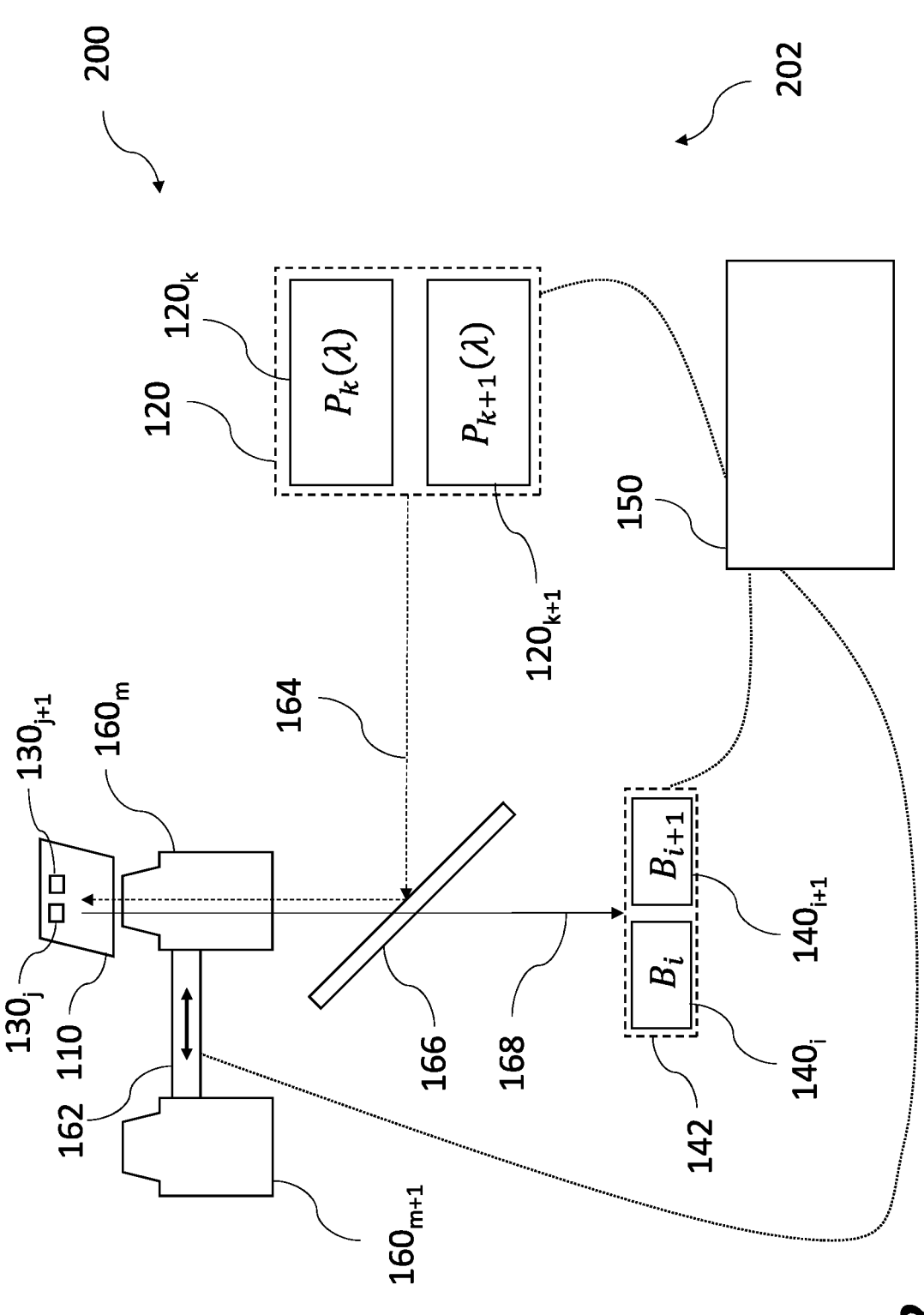
FIG. 2 schematically shows a microscope system according to a further embodiment of the invention.

FIG. 2 illustrates, very schematically, a microscope system 202 comprising a fluorescence microscope 200 according to a further embodiment of the invention. Fluorescence microscope 200, basically, corresponds to fluorescence microscope 100 of FIG. 1. However, fluorescence microscope 200 comprises, by means of example, two light source $120_k$, $120_{k+1}$ in a common light housing 120, for two different excitation wavelengths. In other words, there is a further light source $120_{k+1}$ in addition to the one of fluorescence microscope 100. In addition, light source $120_{k+1}$ can vary the illumination intensity; this is, in particular, independent from light source $120_k$. The light path 164, 168 is common to all light sources. Using several light sources allows setting their illumination intensity simultaneously, so that sequential operation or sequential setting is not required.

Further, the sample 110 comprises two fluorophores, denoted $130_j$, $130_{j+1}$ (while in FIG. 1, only reference numeral 130 was used). Each fluorophore is to be stimulated by a different excitation wavelength. Further, two (individual) detectors $140_i$, $140_{i+1}$, detecting imaging intensities $B_i$, $B_{i+1}$, are provided in, e.g., a common housing 142. While in this example, two light sources, two fluorophores and two detectors are shown, also more than two of each of them can be used, depending on the specific needs or withes of a user or experiment. Note that the numbers of light sources, fluorophores and detectors does not necessarily have to correspond to other.

Each light source, which emits an excitation wavelength, can be assigned a corresponding fluorophore, which in turn emits fluorescence radiation, which in turn is detected by a corresponding detector. Thus, the detectors are assigned to each of the distinguishable fluorophores.

For each of the light sources, the respective illumination intensity after an objective change (or another change in the light path) can be determined by means of the physical model individually, as explained above for a single light source. In particular, cross-talk effects in excitation and/or detection can be considered as mentioned above.

Figure 3:
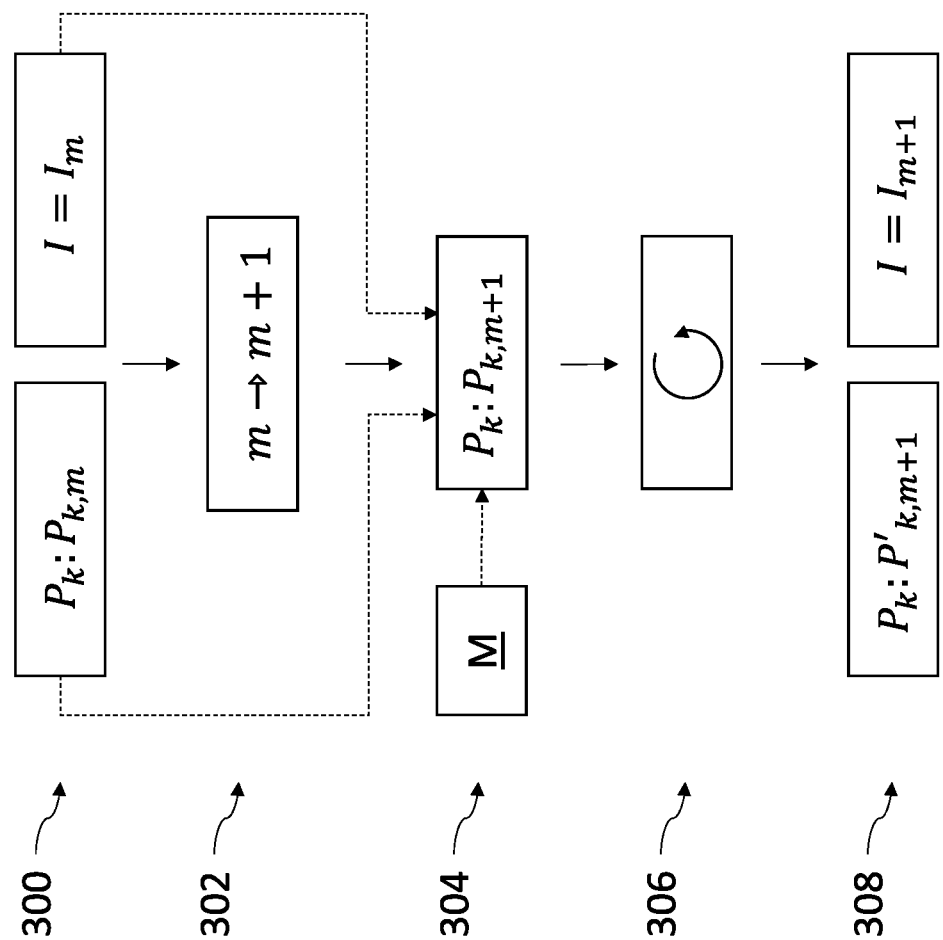
FIG. 3 shows a flow diagram of a method according to an embodiment of the invention.

FIG. 3 illustrates a method according to an embodiment of the invention by means of a flow diagram, in which method the illumination intensity of the light source of the fluorescence microscope 100, as shown in FIG. 1, will be adjusted. In step 300, an examination of the sample is performed using objective m and a certain value $P_{k,m}$ as a control value (drive current) for the light source; this corresponds to a certain value of the illumination intensity $P_k$ of the light source. The illumination intensity I at the sample (the examination parameter), thus, shall have the value $I=I_m$.

In step 302, the objective m ($160_m$) is exchanged by the objective m+1 ($160_{m+1}$). After or also during that exchange, a new control value $P_{k,m+1}$ (drive current) for the light source is determined, in step 304, which results in a value for the illumination intensity I at the sample, which is very close to the value $I_m$ before the change of the objective. This is performed using the physical model M as explained above with respect to FIG. 1. In particular, imaging characteristics of optical components present in the light path (and which might change with the change of the objective) are taken into account.

According to the formula $$P_{k,m+1} = P_{k,m}\frac{F_m}{F_{m+1}}$$

wherein $$I_m = F_m P_{k,m}$$

the new control value $P_{k,m+1}$ is determined and set. As mentioned above, this new control value results in an illumination intensity I at the sample close to the value $I_m$ before the change of the objective.

In order to better adjust the control value—and in order to achieve an illumination intensity I at the sample even closer to the value $I_m$ or any other desired value—an iterative method is performed in step 306. Such iterative method includes varying the control value slightly and observing the resulting illumination intensity I at the sample. Examples for such iterative methods can be found in literature referring to numerical optimization, with, for example, the Newton method or a quasi-Newton method being particularly easy to adapt to the current model. These steps are repeated until the illumination intensity I at the sample has reached the desired value $I=I_{m+1}$; depending on the situation, such desired value can be considered achieved if a small range of, e.g., +/−5% of the value is achieved. The corresponding final control value $P'_{k,m+1}$ is then set in order to provide the corresponding illumination intensity of the light source. This allows further examination with the objective having changed but the illumination intensity at the sample (almost) constant.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 3. Alternatively, a microscope may be part of or connected to a system as described in connection with one or more of the FIGS. 1 to 3. FIG. 1 shows a schematic illustration of a system 102 configured to perform a method described herein. The system 102 comprises a microscope 100 and a computer system (or control system) 150. The microscope 100 is configured to take images and is connected to the computer system 150. The computer system 150 is configured to execute at least a part of a method described herein. The computer system 150 may be configured to execute a machine learning algorithm. The computer system 150 and microscope 100 may be separate entities but can also be integrated together in one common housing. The computer system 150 may be part of a central processing system of the microscope 100 and/or the computer system 150 may be part of a subcomponent of the microscope 100, such as a sensor, an actor, a camera or an illumination unit, etc. of the microscope 100.

The computer system 150 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 150 may comprise any circuit or combination of circuits. In one embodiment, the computer system 150 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 150 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 150 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 150 may also include a display device, one or more speakers, and a keyboard and/or controller, which can include a mouse, trackball, touch screen, voice-recognition device, or any other device that permits a system user to input information into and receive information from the computer system 150.

Some or all of the method steps may be executed by (or using) a hardware apparatus, like for example, a processor, a microprocessor, a programmable computer or an electronic circuit.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100, 200 fluorescence microscope
102, 202 microscope system
110 sample
120 light source housing
120$_k$, 120$_{k+1}$ light sources
122 collector lens
124 illumination field diaphragm
126 condenser lens
130, 130$_j$, 130$_{j+1}$ fluorophores
132 pupil of objective
134 illuminated object field
136 tube lens
140 detector housing
140, 140$_i$, 140$_{i+1}$ detectors
150 control system
160$_m$, 160$_{m+1}$ objectives
162 objective changing mechanism
164 illumination beam path
168 imaging beam path
$A_{LF}$ area of field diaphragm
$A_I$ area of illuminated object field
$2r_{LF}$ pupil illumination diameter
$T_m$ transmission
$\beta_m$ magnification
$NA_m$ numerical aperture
$f_{ref}$ focal length
$n_m$ immersion index
$P_k(\lambda)$, $P_{k+1}(\lambda)$ illumination intensities
$B$, $B_i$, $B_{i+1}$ image intensities
300-308 method steps

The invention claimed is:

1. A control system for automatedly determining an illumination intensity of at least one light source of a fluorescence microscope, the at least one light source used for stimulating at least one fluorophore in a sample, the at least one light source being configured to vary the illumination intensity, and the microscope having at least one detector used for detecting an image intensity of the sample, the control system configured to:

automatedly determine, after a change in a light path, a control value for the illumination intensity of the at least one light source, in order to achieve a desired value of an inspection parameter characterizing sample inspection, whereby the light path comprises at least one of: an illumination path from the at least one light source to the sample and an imaging path from the sample to the at least one detector, wherein determining the control value for the illumination intensity of the at least one light source is based on: (i) a value of the illumination intensity that was set before the change in the light path, (ii) a value of the inspection parameter used before the change in the light path, and (iii) a physical model of the light path, the physical model mapping the illumination intensity of the at least one light source to the inspection parameter, taking into account imaging characteristics of optical components in the light path, and wherein the control system is further configured to determine a final control value for the illumination intensity, at which the desired value of the inspection parameter is achieved, based on an iterative method, wherein the control value determined based on the physical model is used as a starting value in the iterative method.

2. The control system of claim 1, wherein the imaging characteristics of optical components in the light path taken into account in the physical model, comprise at least of the group of: a magnification of an objective, a transmission of an objective, a numerical aperture of an objective, a refractive index of an immersion medium, an area of an illumination field diaphragm in an intermediate image, and a ratio of a total pupil area and an illuminated pupil area at the objective, a magnification of a system optics component, and a focal length of a system optics component.

3. The control system of claim 1, wherein the inspection parameter relates to a desired illumination intensity at the sample.

4. The control system of claim 1, wherein the inspection parameter relates to a desired imaging intensity of the sample detected at the at least one detector.

5. The control system of claim 4, wherein the desired value of the imaging intensity of the sample detected at the at least one detector is defined based on a value derived from photon statistics detected at the detector for the at least one fluorophore.

6. The control system of claim 1, wherein the desired value of the inspection parameter deviates from the value of the inspection parameter used before the change in the illumination path by no more than 10.

7. The control system of claim 1, wherein the change in the light path comprises a change of an objective of the microscope, which is currently arranged in the light path.

8. The control system of claim 1, wherein the fluorescence microscope comprises at least two light sources, the at least two light sources used for stimulating different ones of at least two fluorophores in the sample, the at least two light sources being configured to vary the illumination intensity individually, the control system further configured to: automatedly determine, after the change in the light path, a control value for the illumination intensity for each one of the at least two light sources individually.

9. The control system of claim 8, wherein determining the control value for the illumination intensity for each one of the at least two light sources individually further comprises: determining at least one of: a cross excitation and a cross emission of the at least two fluorophores in the sample in order to consider cross talk effects in at least one of excitation and detection.

10. The control system of claim 1, further configured to: automatedly detect the change in the light path.

11. The control system of claim 1, further configured to: automatedly adapt the illumination intensity of the at least one light source according to the determined control value for the illumination intensity, in particular by means of adapting electrical power supplied to the at least one light source.

12. The control system of claim 11, configured to: automatedly adapt the illumination intensity of the at least one light source according to the determined control value for the illumination intensity by adapting electrical power supplied to the at least one light source.

13. A microscope system, comprising a fluorescence microscope and the control system of claim 1.

14. The microscope system, of claim 13, wherein the fluorescence microscope is configured as an epi-fluorescence microscope.

15. A method for automatedly determining an illumination intensity of at least one light source of a fluorescence microscope, the at least one light source used for stimulating at least one fluorophore in a sample, the at least one light source being configured to vary the illumination intensity, and the microscope having at least one detector used for detecting an image intensity of the sample, the method comprising:

determining, after a change in a light path, a control value for the illumination intensity of the at least one light source, in order to achieve a desired value of an inspection parameter characterizing sample inspection, whereby the light path comprises at least one of: an illumination path from the at least one light source to the sample, and an imaging path from the sample to the at least one detector, wherein determining the control value for the illumination intensity of the at least one light source is based on (i) a value of the illumination intensity that was set before the change in the illumination path, (ii) a value of the inspection parameter used before the change in the light path, and (iii) a physical model of the light path, the physical model mapping the illumination intensity of the at least one light source to the inspection parameter, taking into account imaging characteristics of optical components in the light path, and wherein the method further comprises determining a final control value for the illumination intensity, at which the desired value of the inspection parameter is achieved, based on an iterative method, wherein the control value determined based on the physical model is used as a starting value in the iterative method.

16. The method of claim 15, wherein the change in the light path comprises a change of an objective of the microscope, which is currently arranged in the light path.

17. The method of any one of claim 15, wherein the fluorescence microscope comprises an epi-fluorescence microscope.

18. A non-transitory computer-readable storage medium having processor-executable instructions stored thereon, wherein the processor-executable instructions, when executed, facilitate performance of the method of claim 15.

* * * * *